July 27, 1937.  H. E. MILLER  2,087,956
GUY WIRE PROTECTOR
Filed June 28, 1934
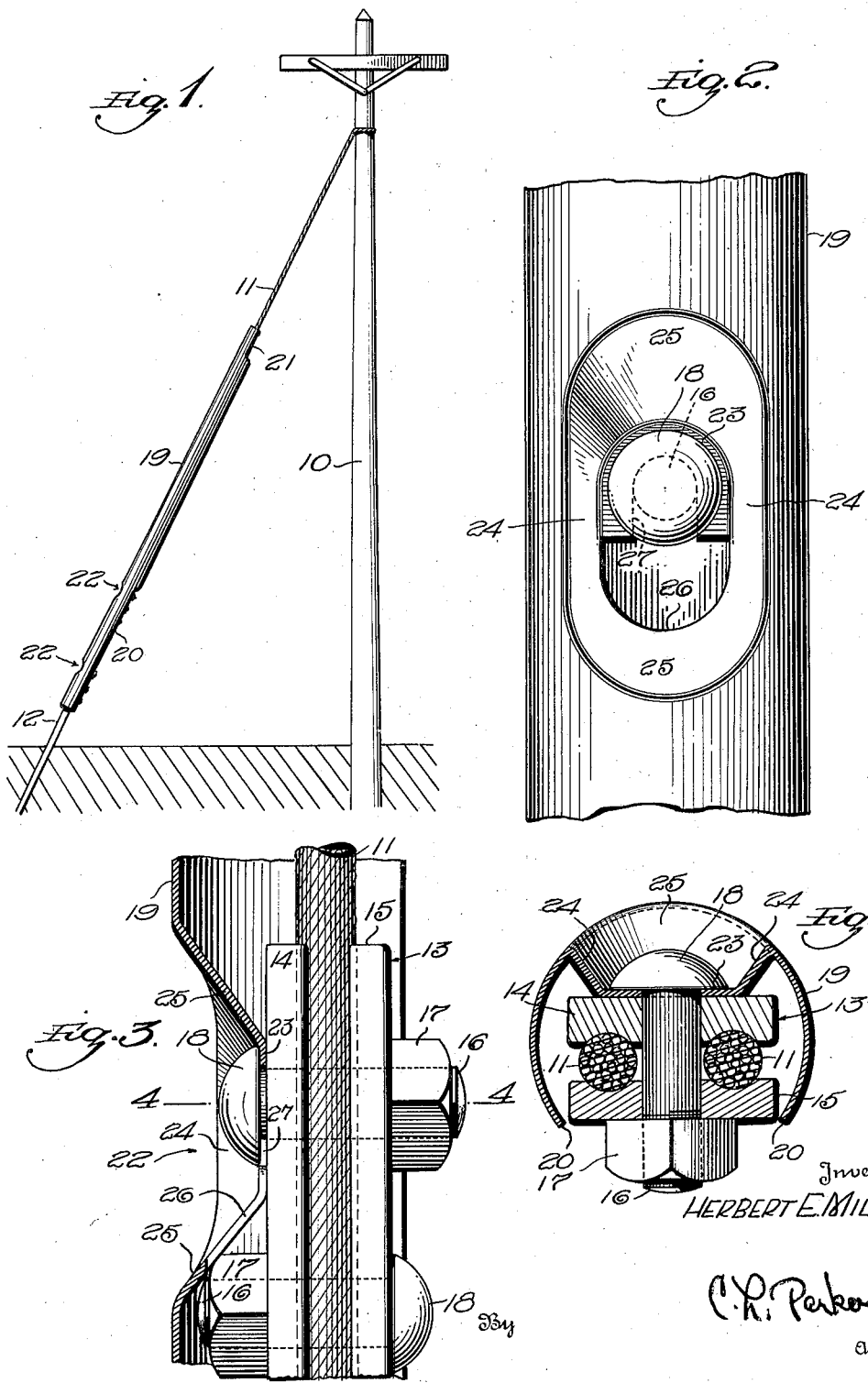
Inventor
HERBERT E. MILLER Patented July 27, 1937

2,087,956

UNITED STATES PATENT OFFICE 2,087,956

GUY WIRE PROTECTOR

Herbert E. Miller, Allentown, Pa., assignor to Utilities Service Company, Inc., Allentown, Pa., a corporation of Pennsylvania Application June 28, 1934, Serial No. 732,901

13 Claims. (Cl. 189—31.5)

This invention relates to guy wire protectors, and is an improvement over the structures described and claimed in my prior Patents Nos. 1,902,414, granted March 21, 1933 and 1,933,818, granted November 7, 1933.

In my prior structures referred to, I have employed an elongated transversely curved guy guard body having means associated therewith for securing the body to the guy wire structure. More specifically, the prior devices referred to were provided with openings adapted to receive a portion of the guy wire clamp, such as one of the clamp bolts. In Patent No. 1,902,414, the body of the guard was provided with a depression forming a seat and having an opening corresponding in shape and size to and adapted to receive one of the clamp bolts, the nut being applied to the bolt and drawn up tight against the seat after the device was in position.

An important object of the present invention is to provide a guy wire protector which embodies the improvements and advantages of the prior structures referred to and forming an improvement thereover in that it does not require the removal of any element of the guy wire structure to permit it to be secured in position.

A further object is to provide a protector of the character referred to which is adapted particularly for connection with one of the clamp bolts without the necessity of having to remove such bolt.

A further object is to provide a sheet metal guy guard having a portion thereof formed to be slipped over a proper portion of the guy wire structure to be retained in position thereby.

A further object is to provide a sheet metal guy guard body having a depression formed with a slot therein engageable around the shank of a clamp bolt or other portion of the guy wire structure, and provided with an opening communicating with the interior of the body to permit such portion of the guy wire structure to be inserted into the slot.

A further object is to provide a guard body of the character just described which is particularly adapted for engagement with the shank of one of the clamp bolts beneath the head thereof, whereby such bolt may be loosened to permit the guard to be placed in position and then tightened to firmly secure the guard to the wire clamp.

Other objects and advantages of the invention will become apparent during the course of the following description.

In the drawing I have shown one embodiment of the invention. In this showing:

Figure 1 is a side elevation showing the device applied to a guy wire structure, Figure 2 is an enlarged fragmentary face view of a portion of the guy guard, Figure 3 is a central longitudinal sectional view through the same, showing it in position with respect to the guy wire structure, and, Figure 4 is a detail section on line 4—4 of Figure 3.

Referring to Figure 1, the numeral 10 designates a telephone or similar pole which is braced in the usual manner by a guy wire structure including a guy wire 11, an anchor 12 and a clamp indicated as a whole by the numeral 13. The clamp includes oppositely arranged clamping plates 14 and 15 engageable against opposite strands of the guy wire which has its lower end passed around a portion of the anchor 12 or through an eye formed at the upper end thereof. The clamp plates 14 are secured together by suitable bolts each of which includes a shank 16, nut 17 and head 18. The several bolts of the clamp are preferably alternately reversed in accordance with the usual practice.

The device forming the subject matter of the present invention comprises a sheet metal guard body 19 which is preferably curved in cross-sectional shape as indicated in Figure 4, the adjacent edges 20 of the guard being preferably spaced apart. It will be apparent, however, that the arcuate curvature of the guard body is not material to the present invention. The upper end of the body 19 may be reduced as at 21 to facilitate the connection of the guard with the guy wire, and any suitable means, not shown, may be employed for connecting the reduced portion of the guard to the guy wire, such as the means disclosed in my copending application Serial No. 680,306, filed July 13, 1933. It will become apparent, however, that the invention is not limited to the particular means employed for securing the upper end of the guard to the guy wire.

Adjacent its lower end the body 19 is provided with one or more depressions indicated as a whole in Figure 1 by the numeral 22. Two of these depressions have been illustrated in Figure 1, but it will become apparent that any desired number may be employed. These depressions are identical and only one is used at a time and accordingly only one of the depressions will be described. Referring to Figures 2, 3 and 4 it will be noted that the guard body is stamped inwardly to form a seat portion 23 connected to the guard body by integral side walls 24 and end walls 25. The end and side walls of the depression preferably slope away from the seat 23, but it will become apparent that the particular shape of these walls is of no importance.

The lower end wall 25 is provided with a relatively large opening 26 and the distance between the plane of the seat 23 and a plane parallel thereto and passing through the lower extremity of the opening 26 is at least equal to the height of one of the bolt heads 18 to permit the latter to be inserted in position in a manner to be described. The seat 23 is provided with a slot 27 communicating at its lower end with the opening 26. The upper portion of the slot 27 is preferably semi-circular in shape and approximately of the same diameter as the shanks of the clamp bolts.

The operation of the device is as follows:

One of the nuts 17 is loosened to an extent at least as great as the thickness of the seat 23, the bolts elected for this purpose preferably being one which has the head 18 facing upwardly. The nut having been loosened, the bolt is pressed upwardly to space the head 18 from the clamp plate 14. The upper end of the guard body is then connected to the guy wire with the head 18 of the loosened bolt arranged slightly below the opening 26. The guard body is then slid downwardly and the bolt head 18 passes through the opening 26 whereupon the slot 27 slides around the shank of the bolt. The nut 17 is then tightened and the operation is completed. In this connection, it will be noted that the space between the edges 20 is preferably greater adjacent the lower end of the guard to permit the latter to swing inwardly to proper position with respect to the clamp. In other words, this space is preferably sufficiently wide to permit the clamp elements to enter the guard body transversely thereof.

While the seat 23 is preferably arranged beneath one of the bolt heads 18, it will be apparent that the device may be used equally well with the seat inserted beneath one of the upwardly facing nuts 17. The seat is preferably inserted beneath one of the heads 18 for the reason that the head 18 may be tightened against the seat 23 without being rotated since the tightening action is accomplished by rotating the nut 17. Moreover, each head 18 is somewhat smaller than the nuts 17, thus requiring a smaller opening 26.

As previously stated, one or more of the depressions 22 may be formed in the guard body, and the purpose of providing a plurality of depressions is to permit the guard to be arranged close to the ground regardless of the height of the clamp 12. Variations in the height of the clamp may be compensated for by connecting one of the depressions 22 to either of the bolts of the clamp. If the clamp is arranged at a substantial height from the ground, the upper depression 22 may be employed, while the lower depression may be used if the clamp is relatively close to the ground. Thus it will be apparent that the employment of two of the depressions 22 is preferred but is not in any sense essential to the proper operation of the device.

The device is preferably connected to one of the bolts of the clamp for two reasons. In the first place, the use of a bolt as the securing means permits the guy guard to be securely attached to the guy wire structure, and in the second place it eliminates the necessity of providing a separate element for this purpose. For example, the clamp plate 14 could be provided with a shouldered lug frictionally engageable in the slot 27 and shaped similar to the bolt head 18. Moreover, a wholly separate bolt could be provided for holding the guard in position. The use of one of the clamp bolts for this purpose, however, is preferred for the reasons stated.

Moreover, it will be apparent that the invention is not limited to the connection of the guard body to the guy clamp since the guy wire itself or the anchor may be provided with a lug or bolt of any desired type to which the body may be connected. It is understood therefore that where the expression "guy wire structure" is employed in the claims, this term is intended to mean either of the elements making up the guy wire structure as a whole, such as the guy wire itself, the anchor 12 or the clamp device 13.

Regardless of the possible variations in the means for securing the guard body to the guy wire structure, the device eliminates the use of separate parts and the time required for the handling and installation of such parts. It also will be apparent that the guard may be installed in position with the least possible expenditure of time since it merely is necessary to loosen one of the clamp bolts, arrange the device in position and then tighten the bolt, without the necessity of having to remove the bolt. Thus a lineman may install a great number of the devices in a single day, thereby reducing labor costs.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A guy guard comprising an elongated body adapted to be arranged over a guy wire structure, and means including a recess carried by said body and provided with a slot having a relatively narrow upper end and a relatively wide lower end terminating in said recess and adapted to receive a projecting element carried by the guy wire structure.

2. A guy guard comprising an elongated body adapted to be arranged over a guy wire structure, and a recess carried by said body and having a portion arranged in a plane parallel to the axis of said body, said recess being provided with a slot having a relatively narrow upper end and a relatively wide lower end terminating in said recess and adapted to receive a projecting element carried by the guy wire structure.

3. A guy guard comprising an elongated body of sheet material adapted to be arranged over a guy wire structure, said body having a depression provided with a slot having a relatively narrow upper end and a relatively wide lower end terminating in said depression and adapted to receive a projecting element carried by the guy wire structure.

4. A guy guard comprising an elongated body of sheet material adapted to be arranged over a guy wire structure, said body being provided with a depression having an opening in its lower portion and provided above said opening with a slot smaller than said opening and communicating therewith, said opening being of a size to admit the passage therethrough of a headed shank carried by the guy wire structure, said slot being of a size to substantially fit said shank.

5. A guy guard comprising an elongated body of sheet material adapted to be arranged over a guy wire structure, said body being provided with a depression having a depressed seat portion parallel to the axis of said body and end walls extending between said seat and the surrounding portions of said body, the lower of said end walls having a relatively large opening therethrough and said seat having a slot smaller than said opening and communicating at its lower end therewith, said opening being of a size adapted to permit the passage therethrough of the head of a shank member carried by the guy wire structure upon downward longitudinal movement of said body with respect to the guy wire structure, said slot being of a size and shape adapted to receive the shank of said shank member.

6. A guy guard comprising an elongated transversely curved sheet metal body adapted to be arranged over a guy wire structure including a guy wire, an anchor and a bolt clamp, said body being provided intermediate the longitudinal edges thereof with a depression forming a flat central seat parallel to the axis of said body and sloping upper and lower end walls, the material forming said depression having an opening extending through the lower of said end walls and of a size sufficient to permit the passage therethrough of one of the clamp bolts upon downward longitudinal movement of said body with respect to the guy wire structure, said seat being provided with a slot communicating at its lower end with said opening and of a width adapted to receive the shank of said bolt.

7. The combination with a guy wire structure including a guy wire, an anchor, and a clamp for connecting the guy wire to the anchor, of a projecting element carried by the guy wire structure, an elongated guy guard body adapted to be arranged over the guy wire structure, and means including a recess carried by said body and provided with a slot having a relatively narrow upper end and a relatively wide lower end terminating in said recess and adapted to receive said projecting element.

8. The combination with a guy wire structure including a guy wire, an anchor, and a clamp for connecting the guy wire to the anchor, of a projecting element carried by the guy wire structure, an elongated guy guard body adapted to be arranged over the guy wire structure, and a recess carried by said body and having a portion arranged in a plane parallel to the axis thereof, said recess being engageable against the guy wire structure and provided with a slot having a relatively narrow upper end and a relatively wide lower end terminating in said recess and adapted to receive said projecting element.

9. The combination with a guy wire structure including a guy wire, an anchor, and a clamp for connecting the guy wire to the anchor, of a projecting element carried by the guy wire structure, an elongated guy guard body adapted to be arranged over the guy wire structure, said body having a depression provided with a slot having a relatively narrow upper end and a relatively wide lower end terminating in said depression and adapted to receive said projecting element.

10. The combination with a guy wire structure including a guy wire, an anchor, and a clamp for connecting the guy wire to the anchor, of a headed shank carried by the guy wire structure, and a guy guard body formed of sheet material adapted to be arranged over the guy wire structure, said body being provided with a depression having an opening in its lower portion and a slot above said opening smaller than said opening and communicating at its lower end therewith, said opening being of a size to admit the head of said shank therethrough, said slot being of a size to fit said shank.

11. The combination with a guy wire structure including a guy wire, an anchor, and a clamp for connecting the guy wire to the anchor, of a headed shank carried by said guy wire structure, and an elongated guy guard body formed of sheet material adapted to be arranged over the guy wire structure, said body being provided with a depression having a depressed seat portion engageable against the guy wire structure and end walls extending between said seat and the surrounding portions of said body, the lower end wall having an opening therethrough and said seat having a slot smaller than said opening and communicating at its lower end therewith, said opening being of a size adapted to permit the passage therethrough of the head of said shank upon downward longitudinal movement of said body with respect to the guy wire structure, said slot being of a size adapted to receive said shank beneath the head thereof.

12. The combination with a guy wire structure including a guy wire, an anchor, and a clamp for securing the guy wire to the anchor and provided with clamping bolts, of an elongated guy guard body formed of sheet metal and curved transversely for arrangement over the guy wire structure, said body being provided intermediate the longitudinal edges thereof with a depression forming a flat central seat parallel to the axis of said body and sloping upper and lower end walls, the material forming said depression having an opening extending through the lower of said end walls and of a size sufficient to permit the passage therethrough of the head of one of the clamp bolts upon downward longitudinal movement of said body with respect to said guy wire structure, said seat being provided with a slot communicating at its lower end with said opening and of a width adapted to receive the shank of said bolt.

13. A guy guard comprising an elongated body of sheet material adapted to be arranged over a guy wire structure, said body having a depression defined at its longitudinal lower end by a wall having on opening therethrough, said depression being provided above said wall with a slot smaller than and communicating at its lower end with said opening.

HERBERT E. MILLER.